United States Patent

Böhmler

[11] Patent Number: 5,836,534
[45] Date of Patent: Nov. 17, 1998

[54] FORCE LIMITING DEVICE IN A SAFETY BELT RETRACTOR

[75] Inventor: Klaus Böhmler, Schwäbisch Gemünd, Germany

[73] Assignee: TRW Occupant Restraint Systems GmbH, Alfdorf, Germany

[21] Appl. No.: 702,837

[22] Filed: Aug. 23, 1996

[30] Foreign Application Priority Data

Aug. 30, 1995 [DE] Germany .................. 295 13 942.0

[51] Int. Cl.⁶ .................................................. B60R 22/28
[52] U.S. Cl. .......................................................... 242/379.1
[58] Field of Search ........................ 242/379.1; 280/805, 280/806; 297/470, 471, 472

[56] References Cited

U.S. PATENT DOCUMENTS

| | | | |
|---|---|---|---|
| 3,790,099 | 2/1974 | Beller ..................................... | 242/379.1 |
| 3,881,667 | 5/1975 | Tandetzke . | |
| 3,927,846 | 12/1975 | Meissner . | |
| 3,944,164 | 3/1976 | Tibbe . | |
| 3,952,967 | 4/1976 | Barile et al. . | |
| 3,961,761 | 6/1976 | Wiesbock .............................. | 242/379.1 |
| 5,511,739 | 4/1996 | Dybro et al. .......................... | 242/379.1 |
| 5,547,143 | 8/1996 | Miller et al. .......................... | 242/379.1 |
| 5,607,118 | 3/1997 | Dybro et al. .......................... | 242/379.1 |
| 5,626,306 | 5/1997 | Miller et al. .......................... | 242/379.1 |

FOREIGN PATENT DOCUMENTS

| | | |
|---|---|---|
| 4942624 | 7/1971 | Japan . |
| 54-166621 | 5/1977 | Japan . |
| 52-99519 | 8/1977 | Japan . |
| 54-35919 | 3/1979 | Japan . |
| 96/05988 | 2/1996 | WIPO . |

*Primary Examiner*—John M. Jillions
*Attorney, Agent, or Firm*—Tarolli, Sundheim, Covell Tummino & Szabo

[57] ABSTRACT

A force limiting device for use in a safety belt retractor. The retractor has a hollow belt spool. A shaft axially extends through the belt spool. A pair of ratchet wheels are each connected to one axial end of the shaft. An internally threaded nut is coaxially accommodated within and connected to the belt spool for joint rotation and relative axial displacement. The shaft is externally threaded and engaged with the nut. The shaft has an axial abutment, and an energy dissipating sleeve of plastically deformable material is engaged axially between the nut and the axial abutment.

6 Claims, 1 Drawing Sheet

FIG. 1
FIG. 2
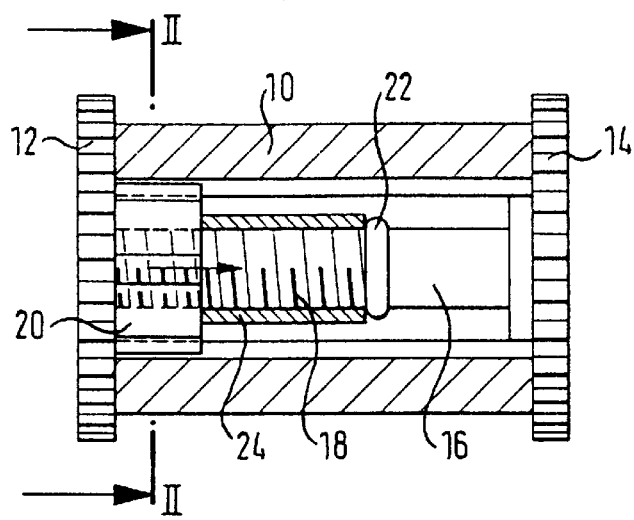
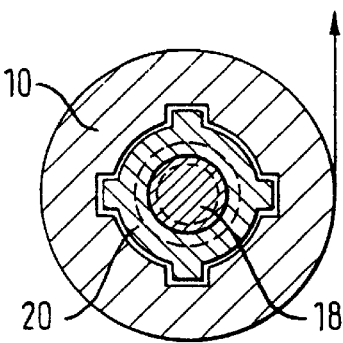
FIG. 3
FIG. 4
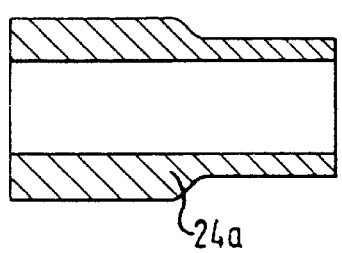
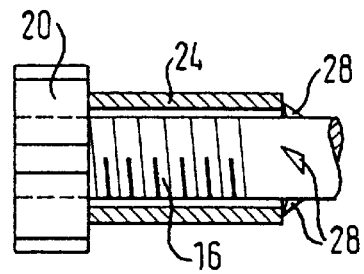
FIG. 5
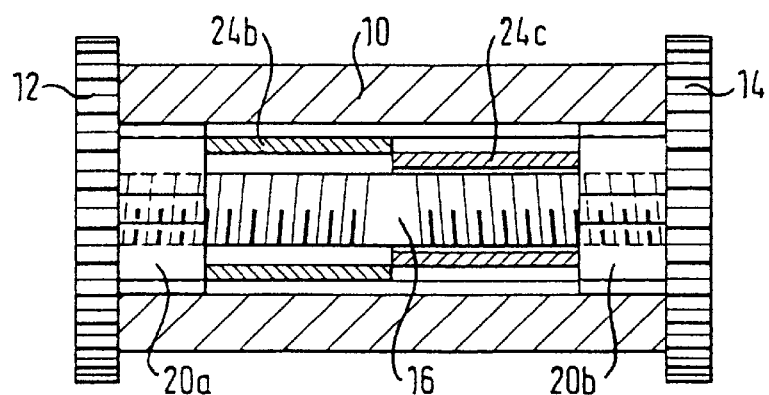

FORCE LIMITING DEVICE IN A SAFETY BELT RETRACTOR

BACKGROUND OF THE INVENTION

The present invention relates to a force limiting device in a safety belt retractor.

From DE 42 27 781 A1 a force limiting device is known which is formed by a torsion bar mounted coaxially inside a hollow reel of a belt retractor. One end of the torsion bar is rigidly joined to the belt whilst the other end is locked at the load-bearing frame of the retractor in response to excessive vehicle deceleration. The belt reel can then only be rotated against the resistance of the torsion bar which undergoes plastic deformation when subjected to torsion. A force limiting device of this kind can reliably reduce the high load peaks which occur in the belt webbing in the course of a vehicle collision.

SUMMARY OF THE INVENTION

The invention provides a force limiting device o n a safety belt retractor which, using simple means, enables the force limiting characteristic to be influenced in a specific way, the force limiting characteristic indicating the belt force as a function of the angle of rotation of the belt reel or the length of the belt webbing withdrawn from the reel.

According to a first aspect of the invention, a force limiting device for use in a safety belt retractor is provided, the retractor having a hollow belt spool and a shaft axially extending through the belt spool. A pair of ratchet wheels are each connected to one axial end of the shaft. An internally threaded nut member is coaxially accommodated within and connected to the hollow belt spool for joint rotation and relative axial displacement. The shaft is externally threaded and engaged with the nut member. The shaft further has an axial abutment, and an energy dissipating member of a plastically deformable material is engaged axially between the nut member and the axial abutment. When the retractor locks up and the spool is rotated under heavy load in an emergency, the threaded nut member moves in an axial direction along the shaft, and presses the energy dissipating member against the axial abutment in such a way that the latter deforms the energy dissipating member. Both plastic deformation and cutting deformation are possible. In both cases, the force that occurs in the belt webbing is limited by energy conversion. Because the cross-section of the energy dissipating member, preferably a tubular body, can be varied, it is possible to influence the characteristic of the belt force as a function of the webbing length. The force limiting device is therefore able to adjust in an optimum way to the demands of the restraint systems used and the conditions in the vehicle by virtue of a variable wall thickness of the tubular body.

According to a second aspect of the invention, a force limiting device for use in a safety belt retractor is provided, the retractor having a hollow belt spool and a shaft axially extending through the belt spool. A pair of ratchet wheels are each connected to one axial end of the shaft. At least one internally threaded nut member is coaxially accommodated within and connected to the hollow belt spool for joint rotation and relative axial displacement. The shaft is externally threaded and engaged with the nut member. A pair of energy dissipating sleeve members of a plastically deformable material is coaxially engaged about the shaft in axial abutment against each other. The nut member, upon relative rotation with respect to the shaft, forcingly and telescopically drives one of the sleeve members into the other, thereby dissipating energy to reduce peak loads in the belt webbing.

A further advantage of the force limiting device according to the invention consists in the fact that a conventional locking mechanism may be used, since locking can be effected in the usual way with two ratchets, which at the same time form the flanges of the belt reel.

In a preferred embodiment of the force limiting device, the shaft has two threaded sections of opposite pitch and a pair of threaded nut members, each of which is engaged with one of the threaded shaft sections. This embodiment is particularly advantageous with a pair of tubular sleeves telescopically driven into each other by the pair of nut members axially moving towards each other.

Further features and advantages of the invention can be seen form the following description and from the drawing, to which reference is made. In the drawing:

BRIEF DESCRIPTION OF THE DRAWINGS

FIG. 1 shows a schematic section of a first embodiment of the force limiting device;

FIG. 2 shows a schematic sectional view along the II—II line in FIG. 1;

FIG. 3 shows a tubular body having a variable wall thickness over its length;

FIG. 4 shows a schematic representation of a variant of the embodiment where a tubular body is deformed by cutting; and FIG. 5 shows a schematic sectional view of a further embodiment.

DETAILED DESCRIPTION OF THE INVENTION

In FIG. 1, two ratchets 12, 14 forming the flanges of a belt reel 10, are rigidly connected by a shaft 16. The shaft 16 has at one of its ends, an external thread 18, with which a threaded nut 20 engages. As can be seen from FIG. 2, the threaded nut 20 is interlocked with belt reel 10 for joint rotation. A collar 22 is also firmly attached to the shaft 16. This collar 22 forms a deformation element for a tubular body 24 axially arranged between it and the threaded nut 20 and which coaxially surrounds the shaft 16.

Upon emergency locking of the ratchets 12, 14 in response to heavy vehicle deceleration, the belt reel 10 is locked until a predetermined load is exceeded, the threaded nut 20 being supported by the tubular body 24 on the collar 22 of the shaft 16. When the belt force continues to increase, then the collar 22 starts to expand the adjacent end of the tubular body 24 and to penetrate the latter. The threaded nut 20 now gradually pushes the tubular body 24 in an axial direction against the collar 22, as shown in FIG. 1 by an arrow, with the collar 22 increasingly deforming the tubular body 24. As a result of this plastic deformation, the load peaks that occur in the belt are reduced. The force is limited to a level, which is determined in particular, also by the wall thickness of the tubular body 24. If the tubular body 24a, shown in FIG. 3 is used, the wall thickness of which can be varied in stages, resulting in a desired characterizing of belt force versus webbing length (or degrees of reel rotation).

In place of plastic deformation, cutting deformation of the tubular body 24 may also take place. An embodiment of this kind is shown in FIG. 4. Instead of the collar 22, the shaft 16 in this case, carries a series of cutting bodies 28, which when the axial load becomes sufficiently great, deforms the tubular body 24 by cutting.

In the embodiment shown in FIG. 5, the shaft 16 has two externally threaded sections of opposite pitch. Engaged with each of these threaded sections is a threaded nut 20*a*, 20*b*. Between the threaded nuts 20*a*, 20*b*, are located two tubular bodies 24*b*, 24*c* which coaxially surround the shaft 16, said tubular bodies 24*b*, 24*c* being capable of telescoping under high axial load. With this embodiment, the force limiting characteristic can be adjusted by a specific variation of the wall thicknesses of the tubular bodies 24*b*, 24*c*.

What is claimed:

1. A force limiting device for use in a safety belt retractor, said retractor having a hollow belt spool, a shaft axially extending through said belt spool, a pair of ratchet wheels each connected to one axial end of said shaft, at least one internally threaded nut member coaxially accommodated within and connected to said hollow belt spool for joint rotation and relative axial displacement, said shaft being externally threaded and engaged with said nut member, and a pair of energy dissipating sleeve members of a plastically deformable material being coaxially engaged about said shaft in axial abutment against each other, said nut member, upon relative rotation with respect to said shaft, forcingly and telescopically driving one of said sleeve members into the other of said sleeve members.

2. The force limiting device of claim 1, wherein said sleeve members are axially engaged between a pair of nut members, said nut members being both coaxially accomodated within and connected to said hollow belt spool for joint rotation and relative axial displacement, and said shaft having two axially spaced externally threaded sections of opposite pitch, each of said nut members being engaged with one of said threaded sections.

3. The force limiting device of claim 2, wherein at least one of said sleeve members has a variable wall thickness in an axial direction.

4. A force limiting device for use in a safety belt retractor, said retractor having a hollow belt spool, a shaft axially extending through said belt spool, a pair of ratchet wheels each connected to one axial end of said shaft, an internally threaded nut member coaxially accommodated within and connected to said hollow belt spool for joint rotation and relative axial displacement, said shaft being externally threaded and engaged with said nut member, said shaft further having an axial abutment, and an energy dissipating member of a plastically deformable material being engaged axially between said nut member and said axial abutment, said axial abutment comprising a plurality of cutting members fitted around the circumference of said shaft.

5. The force limiting device of claim 4, wherein said energy dissipating member is a sleeve coaxially engaged about said shaft.

6. The force limiting device of claim 5, wherein said sleeve has a variable wall thickness in an axial direction.

\* \* \* \* \*